(12) United States Patent
Ammer et al.

(10) Patent No.: US 8,528,108 B2
(45) Date of Patent: Sep. 3, 2013

(54) PROTECTING SECRET INFORMATION IN A PROGRAMMED ELECTRONIC DEVICE

(75) Inventors: Gerhard Ammer, Munich (DE); Michael Chambers, Erlangen (DE); Hai Wang, Poing (DE); Paul Renshaw, Cheadle (GB); Michael Kiessling, Freising (DE)

(73) Assignee: Agere Systems LLC, Wilmington, DE (US)

( * ) Notice: Subject to any disclaimer, the term of this patent is extended or adjusted under 35 U.S.C. 154(b) by 839 days.

(21) Appl. No.: 12/444,160

(22) PCT Filed: Oct. 6, 2006

(86) PCT No.: PCT/EP2006/009690
§ 371 (c)(1),
(2), (4) Date: Sep. 12, 2009

(87) PCT Pub. No.: WO2008/040377
PCT Pub. Date: Apr. 10, 2008

(65) Prior Publication Data
US 2010/0293388 A1    Nov. 18, 2010

(51) Int. Cl.
*G06F 7/04* (2006.01)
*G06F 17/30* (2006.01)
*G06F 9/00* (2006.01)
*G06F 15/177* (2006.01)
*G06F 11/00* (2006.01)
*H04N 7/16* (2011.01)

(52) U.S. Cl.
USPC ........ 726/30; 726/2; 713/2; 713/187; 714/36; 714/38.12; 714/38.13; 714/38.14

(58) Field of Classification Search
USPC .......................................... 713/187; 726/30
See application file for complete search history.

(56) References Cited

U.S. PATENT DOCUMENTS

| | | | |
|---|---|---|---|
| 5,421,006 A | 5/1995 | Jablon et al. | |
| 5,870,726 A | 2/1999 | Lorphelin | |
| 5,877,547 A * | 3/1999 | Rhelimi | 257/679 |
| 5,943,423 A * | 8/1999 | Muftic | 705/67 |
| 6,304,970 B1 * | 10/2001 | Bizzaro et al. | 726/2 |

(Continued)

FOREIGN PATENT DOCUMENTS

| | | |
|---|---|---|
| GB | 2416956 A | 2/2006 |
| WO | 2008040377 A1 | 4/2008 |

OTHER PUBLICATIONS

International Search Report dated Oct. 8, 2008 for PCT/EP2006/009690; (10 pages).

*Primary Examiner* — Carolyn B Kosowski

(57) ABSTRACT

A way for securely protecting secret information—for example, a secret key—in a programmed electronic device is provided. A technique is disclosed for protecting secret information in a programmed electronic device that includes a non-trusted memory containing software, a data memory containing the secret information, and an access restriction logic unit that is adapted to allow or block access to the secret information wherein the secret information is adapted to be used for verifying the integrity of the software. In one embodiment, when starting up the programmed electronic device, the access restriction logic unit allows access to the secret information. Then the secret information is accessed for use in verifying the integrity of the software, and subsequently the access restriction logic unit blocks further access to the secret information. Embodiments of a semiconductor device and a programmed electronic device comprising similar features are also disclosed.

20 Claims, 3 Drawing Sheets

(56) References Cited

U.S. PATENT DOCUMENTS

| | | | |
|---|---|---|---|
| 6,775,778 B1 | 8/2004 | Laczko, Sr. et al. | |
| 6,934,887 B1* | 8/2005 | Baldischweiler | 714/38.13 |
| 7,007,159 B2* | 2/2006 | Wyatt | 713/1 |
| 7,007,300 B1* | 2/2006 | Weber et al. | 726/21 |
| 7,437,574 B2* | 10/2008 | Ronkka et al. | 713/194 |
| 7,475,254 B2* | 1/2009 | Craft | 713/187 |
| 7,657,754 B2* | 2/2010 | Chambers et al. | 713/188 |
| 7,676,665 B2* | 3/2010 | Wyatt | 713/1 |
| 7,764,787 B2* | 7/2010 | Craft | 380/28 |
| 7,917,716 B2* | 3/2011 | Berenbaum et al. | 711/163 |
| 7,996,880 B2* | 8/2011 | Walmsley | 726/2 |
| 8,055,909 B2* | 11/2011 | Kohiyama et al. | 713/191 |
| 8,078,886 B2* | 12/2011 | Dotan | 713/187 |
| 8,132,257 B2* | 3/2012 | Li et al. | 726/22 |
| 2003/0046570 A1* | 3/2003 | Ronkka et al. | 713/193 |
| 2004/0243801 A1* | 12/2004 | Chen et al. | 713/160 |
| 2006/0064762 A1* | 3/2006 | Kayashima et al. | 726/27 |
| 2006/0112241 A1* | 5/2006 | Weiss et al. | 711/154 |
| 2007/0089168 A1* | 4/2007 | Wang et al. | 726/9 |
| 2007/0162964 A1* | 7/2007 | Wang et al. | 726/5 |
| 2007/0192610 A1* | 8/2007 | Chun et al. | 713/176 |
| 2008/0010686 A1* | 1/2008 | Nemoto et al. | 726/27 |
| 2009/0292926 A1* | 11/2009 | Daskalopoulos et al. | 713/176 |
| 2011/0093947 A1* | 4/2011 | Kato et al. | 726/16 |

\* cited by examiner

PROTECTING SECRET INFORMATION IN A PROGRAMMED ELECTRONIC DEVICE

CROSS REFERENCE TO RELATED DISCLOSURE

This application is the National Stage of International Application No. PCT/EP2006/009690 entitled "PROTECTING SECRET INFORMATION IN A PROGRAMMED ELECTRONIC DEVICE," by Agere Systems Inc., invented by Gerhard Ammer, et al., having an international filing date of Oct. 6, 2006, and incorporated herein by reference in its entirety.

TECHNICAL FIELD

This application generally relates to the field of protecting programmed electronic devices against attacks. In particular, the present invention relates to the field of protecting secret information in a programmed electronic device.

BACKGROUND

Programmed electronic devices have become ubiquitous. In most of these devices, it is desirable to provide at least some level of assurance of the integrity of the software stored in the device. For example, if the programmed electronic device is an embedded device controlling functions of an automotive braking system, any tampering with the software stored in the device may be very dangerous. As another example, if the programmed electronic device is a mobile communication device like, for example, a mobile telephone, unauthorized software may spy out confidential information, may incur unwanted charges or may circumvent restrictions like, for example, digital rights management settings. There is therefore a need in the above-mentioned and other programmed electronic devices that the software executed by the device can be trusted.

In principle, all software that is stored in a mutable memory of the programmed electronic device may be a possible target for an attack. Any interface of the programmed electronic device may be used in the attack. For example, manipulated SMS or manipulated WAP data may use a security hole of a browser or message reader to introduce malicious code. It is also possible that a user intentionally tries to change the software stored in the programmed electronic device. In this case, the device is especially vulnerable if the software is stored in a memory that is external to a main semiconductor circuit of the programmed electronic device. Such an external memory may be, for example, an EEPROM or FLASH memory that is located on a printed circuit board of the programmed electronic device or on an external memory card.

It is known in the field of mobile telephones to check the integrity of the application software when starting up the device. A successful integrity check indicates that the software has not been altered or tampered with and can therefore be trusted. For example, the software may be associated with a signature that is or contains a cryptographic hash value of the software. Such a hash value is commonly called a Cryptographic Checksum or Message Authentication Code (MAC) or Integrity Check Value. During the process of starting up the telephone, the cryptographic hash value of the software is re-computed and compared with the value stored in the signature. If both values coincide, the integrity check succeeds, and the software is deemed to be acceptable for execution.

It is important that the cryptographic hash value contains a secret component. Otherwise, an attacker could easily build a new signature matching any modified software. The secret component may be a secret key that is used when calculating the cryptographic hash value of the software both during signature creation and during each startup integrity check. For example, the cryptographic hash value of the software may be obtained from processing the software—seen as a byte sequence—in a DES block mode operation using the secret key. The last resulting block—or a part thereof—may constitute the cryptographic hash value.

The secret information—for example, the secret key—must be stored in the programmed electronic device because it is required for the software integrity check each time the device is started up. On the other hand, the secret information must be hidden from a possible attacker in order to ensure that the attacker cannot calculate a new signature for any modified software. If the secret information is stored, for example, in a one-time programmable (OTP) memory of the programmed electronic device, there is the risk that an attacker may discover and access the secret information. For example, techniques like the use of malicious software or buffer overflows could potentially be employed to execute code to discover the secret key.

Even if the attacker cannot access the secret information directly, there is still the risk that the attacker may manage to execute software or hardware functions of the programmed electronic device that in turn access and use the secret information. For example, such functions could be used by the attacker to encrypt or decrypt data or to generate a valid signature for modified software.

SUMMARY

Certain embodiments of the invention provide a method for protecting secret information in a programmed electronic device, the programmed electronic device comprising a non-trusted memory containing software, a data memory containing the secret information, and an access restriction logic unit that is adapted to allow or block access to the secret information, the secret information being adapted to be used for verifying the integrity of the software. The method comprises, (1) when starting up the programmed electronic device, the access restriction logic unit allowing access to the secret information, (2) accessing the secret information for use in verifying the integrity of the software, and (3) the access restriction logic unit blocking further access to the secret information when a predetermined amount of time has passed after starting up the programmed electronic device.

Certain embodiments of the invention provide a method for protecting secret information in a programmed electronic device, the programmed electronic device comprising a non-trusted memory containing software, a data memory containing the secret information, and an access restriction logic unit that is adapted to allow or block read access to the secret information, the secret information being stored unalterably in the data memory, the secret information being adapted to be used for verifying the integrity of the software. The method comprises, (1) when starting up the programmed electronic device, the access restriction logic unit allowing read access to the secret information, (2) accessing the secret information for use in verifying the integrity of the software, and (3) the access restriction logic unit blocking further read access to the secret information. The method further comprises (4) verifying the integrity of the software using the secret information, comprising, (4a) computing a hash value of the software using a secret key related to the secret information, and (4b) comparing the computed hash value with a predetermined signature associated with the software, wherein the software is executed in the programmed electronic device only if the integrity of the software has been verified successfully.

Certain embodiments of the invention provide a semiconductor device, comprising a data memory storing secret information, a program memory storing startup code, a processor unit adapted for executing the startup code, the startup code being adapted to cause the processor unit to access the secret information in the data memory for use in verifying the integrity of software to be executed by the processor unit, and an access restriction logic unit that allows the processor unit to access the secret information after starting up the semiconductor device and blocks access to the secret information after the processor unit has accessed the secret information, wherein the access restriction logic unit is adapted to block access to the secret information when a predetermined amount of time has passed after starting up the programmed electronic device.

Certain embodiments of the invention provide a programmed electronic device, comprising a data memory unalterably storing secret information, a program memory storing startup code, a non-trusted memory storing software, a processor unit adapted for executing the startup code, the startup code being adapted to cause the processor unit to access the secret information in the data memory for use in verifying the integrity of the software stored in the non-trusted memory, and an access restriction logic unit that allows the processor unit to read the secret information after starting up the programmed electronic device and blocks read access to the secret information after the processor unit has accessed the secret information, wherein the startup code is further adapted to cause the processor unit to verify the integrity of the software using the secret information, wherein the startup code is further adapted to cause the processor unit to compute a hash value of the software using a secret key related to the secret information, and wherein the startup code is further adapted to cause the processor unit to compare the computed hash value with a predetermined signature associated with the software, wherein the software is executed in the programmed electronic device only if the integrity of the software has been verified successfully.

BRIEF DESCRIPTION OF THE DRAWINGS

Further features, objects and advantages of the invention will become apparent when studying the following detailed description, in connection with the annexed drawings, in which.

DETAILED DESCRIPTION

Figure 1:
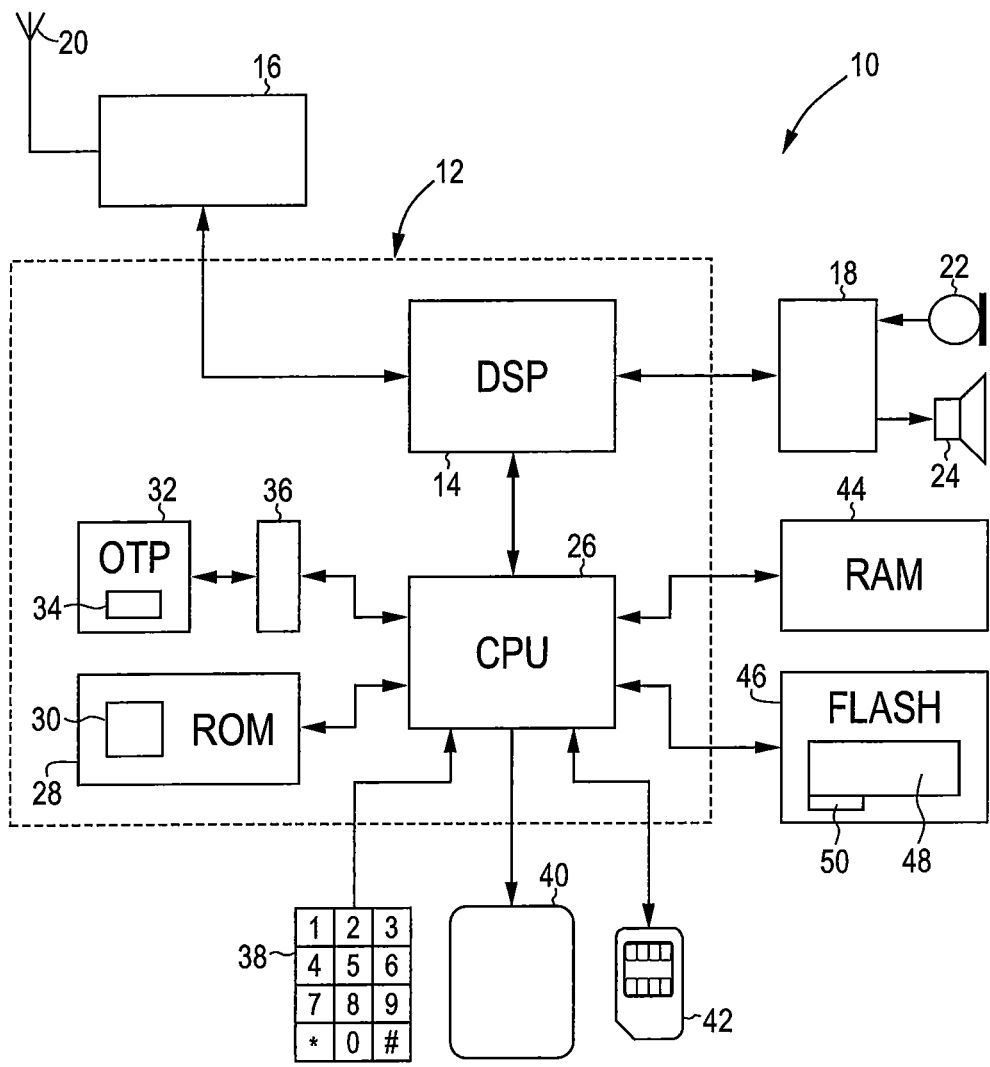
FIG. 1 is a schematic block diagram of a mobile communication device according to one embodiment of the present invention.

The disclosure provides a technique for securely protecting secret information—for example, a secret key—in a programmed electronic device. Additionally, a technique is provided that allows verification of the integrity of software installed in the programmed electronic device with improved resistance against attacks.

The disclosure is based on the fundamental idea that the secret information, which is intended for use in the software integrity check, only needs to be accessed during the phase of starting up the programmed electronic device. Embodiments disclosed herein therefore provide an access restriction logic unit that is adapted to allow access to the secret information when starting up the programmed electronic device such that a software integrity check can be conducted using the secret information. In these embodiments, the access restriction logic is also adapted to block further access to the secret information when such access is no longer needed for the software integrity check.

The access restriction logic unit disclosed herein securely disables any access to the secret information during normal operation of the programmed electronic device, i.e., after the end of the startup phase and the initial software verification phase. Even if an attacker managed to obtain control over the programmed electronic device, the attacker could not access the secret information and could also not execute any system routines—e.g., cryptographic functions—that depend on the secret information.

In different embodiments, there may be different criteria for determining when the secret information is no longer needed and hence further access to it may be blocked. For example, the access restriction logic unit may be configured such that it blocks access to the secret information when a predetermined amount of time has passed after starting up the programmed electronic device. This amount of time may be measured, for example, by an analog or digital timer or by a counter that is clocked by a suitable clock signal available within the programmed electronic device. Alternatively or additionally, the access restriction logic unit may be adapted to be set into an access blocking mode by an external signal or command. For example, a processor unit of the programmed electronic device may disable further access to the secret information by asserting a "disable access" signal or by writing a suitable value into a hardware register of the access restriction logic.

In some embodiments the secret information is individualized for each programmed electronic device. This further increases the level of protection provided by the present invention because a successful attack would only compromise a single programmed electronic device at each time. The secret information may be stored in a one-time programmable memory to ensure that it cannot be altered.

The programmed electronic device of disclosed embodiments may be a mobile device and/or a communication device and/or an embedded device. Embodiments herein also concern a semiconductor device, which may be part of the programmed electronic device. For example, the semiconductor device may be a single integrated circuit or an integrated circuit module. In some embodiments, the semiconductor device is a base band integrated circuit that is adapted for use in, e.g., a mobile telecommunication apparatus.

FIG. 1 shows an example of a programmed electronic device, namely, a mobile communication device 10, in an embodiment of the present invention. The mobile communication device 10 may be, for example, a mobile telephone. However, the present invention is not restricted to mobile communication devices, but can be used in connection with all kinds of programmed electronic devices that must provide some level of protection against execution of unauthorized software.

The programmed electronic device of the present invention generally comprises a semiconductor device, which may be formed of one or more integrated semiconductor circuits. In the present example embodiment, the semiconductor device is a base band integrated circuit 12 of the mobile communication device 10. As it is well known in the art, the base band integrated circuit 12 comprises a digital signal processor 14 (DSP) that is connected to a high frequency unit 16 and a voice frequency unit 18. The high frequency unit 16 is connected to an antenna 20 and serves for sending and receiving modulated radio signals. The voice frequency unit 18 is connected to a microphone 22 and a speaker 24 for receiving and transmitting voice signals from and to a user of the mobile communication device 10.

A processor unit 26 (CPU) interfaces with a variety of components internal or external to the base band integrated circuit 12. The internal components include a program memory 28 that contains a number of program routines, including startup code 30. The program memory 28 may, for example, be a mask-programmed read-only memory (ROM) or another non-changeable memory. A further internal component of the base band integrated circuit 12 is a data memory 32 that contains various configuration values and other data items for operation of the mobile communication device 10. These data items include secret information 34, whose role will be explained in detail below. The data memory 32 may, for example, be a one-time programmable memory (OTP).

The processor unit 26 accesses the data memory 32—or at least the portion of the data memory 32 that stores the secret information 34—via an access restriction logic unit 36. As it will be explained in more detail below, the access restriction logic unit 36 has at least two modes of operation. A first mode of operation is automatically set when the mobile communication device 10 starts up. In this mode, the processor unit 26 is allowed to access the secret information 34. A second mode of operation blocks the processor unit 26 from accessing the secret information 34.

In some embodiments, the access restriction logic unit 36 enters the second mode of operation in response to a signal or command from the processor unit 26, while in other embodiments, the access restriction logic unit 36 enters the second mode of operation automatically after a predetermined time—e.g., some milliseconds—has elapsed after start up of the mobile communication device 10.

In some embodiments, the blocking function of the access restriction logic unit 36 in the second mode of operation may be effective just with respect to the portion of the data memory 32 that stores the secret information 34, while in other embodiments the blocking function may extend to further portions of the data memory 32. In many embodiments, the access restriction logic unit 36 will stay in the second mode of operation as long as the mobile communication device 10 is powered on. In other words, there is no way of resetting the access restriction logic unit 36 to its first mode of operation, other than switching off and re-starting the mobile communication device 10.

The processor unit 26 is further connected to a number of components that are external to the base band integrated circuit 12. These components include a keypad 38, a display 40, a subscriber identity module 42 (SIM), a working memory 44 and a non-trusted memory 46. The working memory 44 may, for example, be a volatile read/write memory (RAM). The non-trusted memory 46 may, for example, be an electrically erasable programmable read-only memory (EEPROM) or a FLASH memory. The non-trusted memory 46 contains software 48 that is intended for execution by the processor unit 26. This software 48 may, for example, be a part of an operating system of the mobile communication device 10 or an application program.

The software 48 stored in the non-trusted memory 46 is associated with a signature 50 that, in the present embodiment, represents a hash value of the "correct", i.e., non-manipulated, software 48. This signature 50 is determined by the manufacturer of the software 48 and/or the mobile communication device 10, and the signature 50 is written into the non-trusted memory 46 together with the software 48.

The validity of the software 48 is checked when starting up the mobile communication device 10 by re-calculating the hash value of the software 48. If the software 48 has not been tampered with, then the re-calculated hash value and the signature 50 will be identical. On the other hand, if the software 48 has been modified or replaced by different program code, then the re-calculated hash value will differ from the signature 50, and the verification will fail. It is apparent that the startup code 30 that performs this integrity check must be trusted. In the present embodiment, tampering with the startup code 30 is prevented by storing the startup code 30 in an immutable memory like, for example, the mask-programmed program memory 28.

In the present embodiment, the hash value is computed as a cryptographic hash value by a cryptographic hashing method both when generating the signature 50 and when performing the startup validity check. In many embodiments, a hashing method that is based on a symmetric cryptographic algorithm is used. For example, this may be the MD5 hashing method or a hashing method of the SHA-1 family or the AES hashing method. The above and other hashing methods are well known in the art.

All of the above cryptographic hashing methods use a secret key to ensure that an unauthorized attacker cannot obtain a valid signature 50 for a modified piece of software 48. In the present embodiment, this secret key is stored as the secret information 34 in the data memory 32. In other embodiments, the secret key may comprise additional or less information than the secret information 34, as long as the secret information 34 enables the cryptographic hashing method to generate the proper hash value of the software 48. In some embodiments a single secret key is used for a plurality of mobile communication devices 10. However, in the present embodiment, the secret key is individualized and is therefore specific to a single mobile communication device 10 and the signature 50 contained therein.

Figure 2:
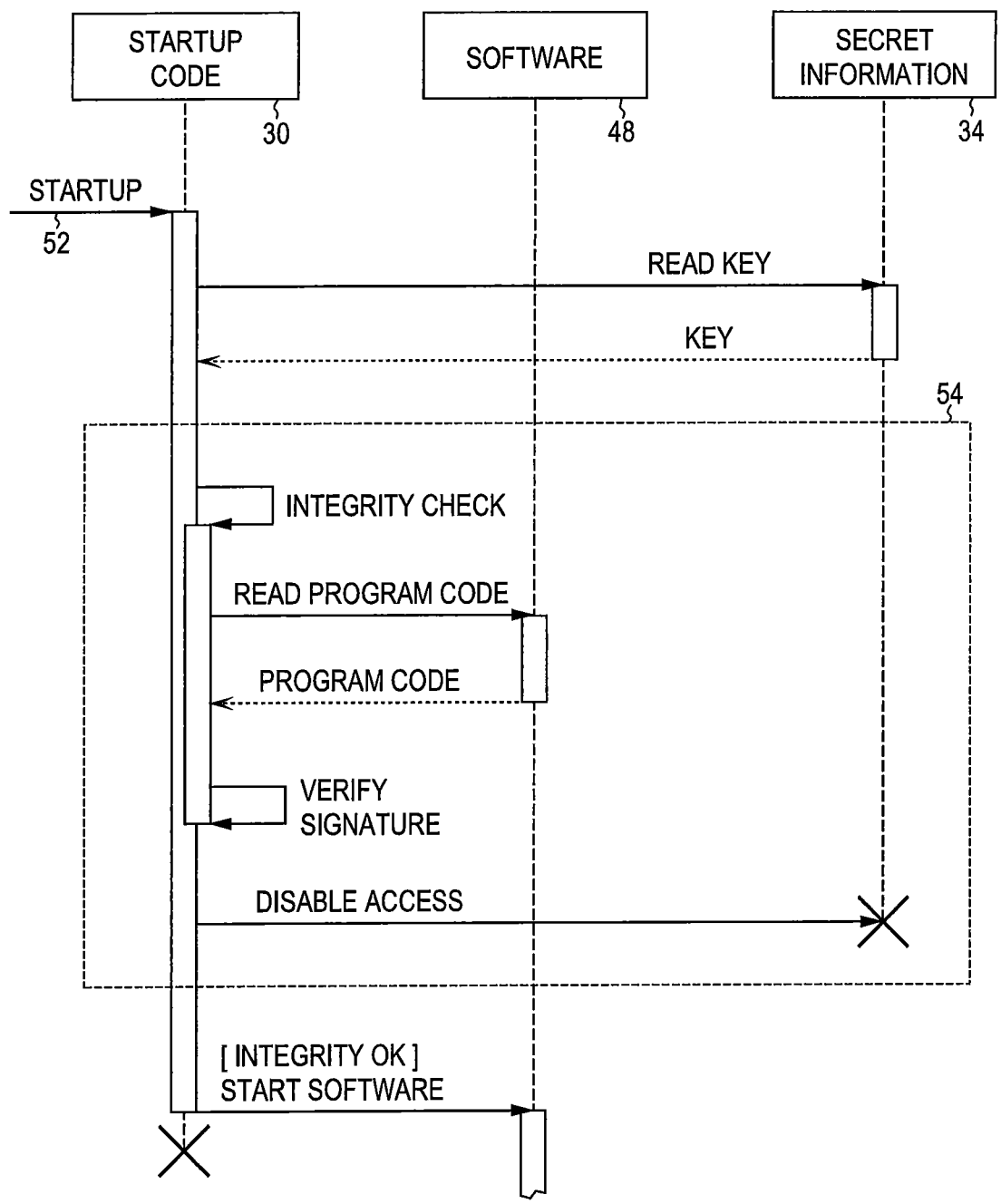
FIG. 2 is a sequence diagram of a method that is performed when starting up the mobile communication device shown in FIG. 1, FIG. 3 and FIG. 4 are schematic block diagrams of components of the mobile communication device of FIG. 1 in a first and second mode of operation of an access restriction logic unit, respectively.

FIG. 2 shows the sequence of events and calculation steps that take place during the phase of starting up the mobile communication device 10. A startup event 52 triggers execution of the startup code 30 stored in the immutable program memory 28. Under control of the startup code 30, the processor unit 36 first reads out the secret information 34—representing a secret hashing key—from the data memory 32. The access restriction logic unit 36 allows this access to the data memory 32 because the access restriction logic unit 36 has been set to its first mode of operation by the startup event 52 or by a hardware power up signal.

The dashed box in FIG. 2 represents the integrity check phase 54. In this phase, the processor unit 26 reads the program code—seen as a byte sequence—that represents the software 48 from the non-trusted memory 46. The processor unit 26 then verifies the signature 50 by calculating the hash value of the program code and comparing this newly calculated hash value with the value of the signature 50.

The access restriction logic unit 36 is set to its second mode of operation during the integrity check phase 54. As a consequence, the access restriction logic unit 36 blocks all further attempts to access the secret information 34. Because the access restriction logic unit 36 is implemented as a hardware component, it cannot be circumvented by any software-based attack. Furthermore, the access restriction logic unit 36 in the present embodiment is designed such that it cannot be switched back from the second—i.e., blocking—mode of operation to the first mode of operation as long as the mobile communication device 10 remains powered on.

If the integrity check has been completed successfully, then the software 48 stored in the non-trusted memory 46 is started, and processing of the startup code 30 terminates. On the other hand, if the integrity check fails (not shown in FIG. 2), then an appropriate error message is generated, and the software 48 is not executed.

In FIG. 2, the step of disabling further access to the secret information by switching the access restriction logic unit 36 to its second mode of operation is shown at the end of the integrity check phase 54. However, in other embodiments the access restriction logic unit 36 may be switched to its second mode of operation immediately after reading out the key from the data memory 32. For example, the read-out operation may at the same time trigger the access restriction logic unit 36 to switch into the blocking mode. In other embodiments, the access restriction logic unit 36 is time controlled such that the switch to the second mode of operation will be made, for example, a few milliseconds after the startup event 52, i.e., at some time during the integrity check phase 54.

Figure 3:
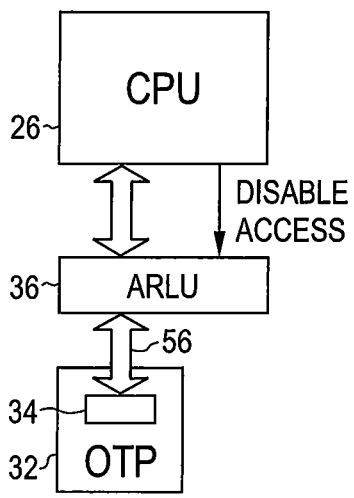
Figure 4:
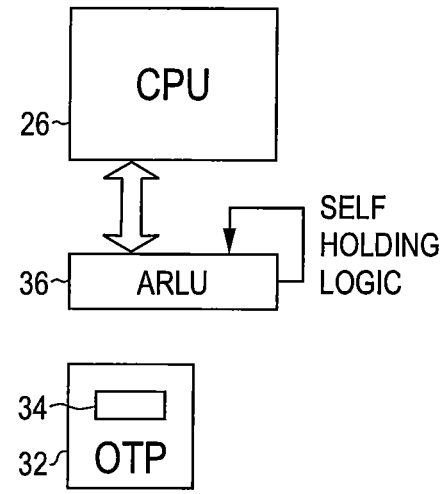

FIG. 3 and FIG. 4 show an example of an access restriction logic unit 36 that is controlled by a signal from the processor unit 26. FIG. 3 depicts the first mode of operation in which the processor unit 26 is allowed to access the secret information through the access restriction logic unit 36; this is symbolized by the arrow 56. When the processor unit 26 asserts the disable access control signal shown in FIG. 3, the access restriction logic unit 36 switches to the second mode of operation shown in FIG. 4. Here, the access restriction logic unit 36 blocks any access to the secret information 34. A self holding logic of the access restriction logic unit 36 ensures that the access restriction logic unit 36 will remain in the second mode of operation as long as the mobile communication device 10 remains powered on.

Figure 5:
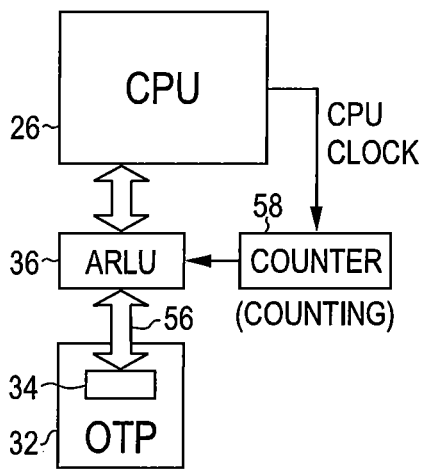
FIG. 5 and FIG. 6 are schematic block diagrams similar to those of FIG. 3 and FIG. 4 in an alternative embodiment.
Figure 6:
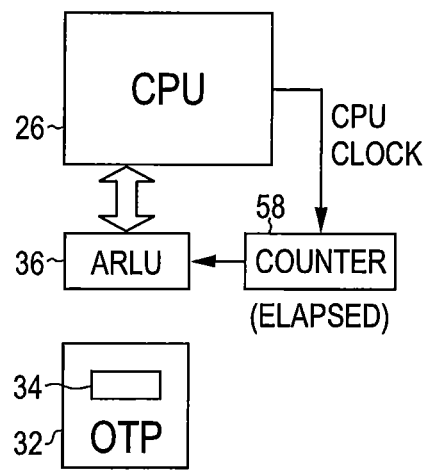

FIG. 5 and FIG. 6 are similar to FIG. 3 and FIG. 4, but show an alternative embodiment in which the access restriction logic unit 36 is essentially time-controlled. Again, FIG. 5 depicts the first mode of operation in which the secret information 34 is accessible. A counter 58 is initially set to a predetermined value N and counts down, driven by a CPU clock or another suitable clock signal. The counter 58 is configured such that the counting stops when the counter 58 reaches zero. At this time the access restriction logic unit 36 is switched to its second mode of operation where all further access to the secret information 34 is disabled.

The particulars contained in the above description of sample embodiments should not be construed as limitations of the scope of the invention, but rather as exemplifications of some embodiments thereof. For example, in alternative embodiments, the disable access control signal of FIG. 3 can be generated by another element of the mobile communication device 10, including the access restriction logic unit 36 itself, in response to an appropriate event. As another example, the counter 58 of FIG. 5 may be replaced by any other timer that causes the access restriction logic unit 36 to switch to the second mode of operation at an appropriate time. Accordingly, the scope of the invention should be determined not by the embodiments illustrated, but by the appended claims and their legal equivalents.

What is claimed is:

1. A method for protecting secret information in a programmed electronic device, the programmed electronic device comprising a non-trusted memory containing software, a data memory containing the secret information, and an access restriction logic unit that is adapted to allow or block access to the secret information, the secret information being adapted to be used for verifying the integrity of the software, the method comprising:
when starting up the programmed electronic device, the access restriction logic unit allowing access to the secret information;
accessing the secret information for use in verifying the integrity of the software; and
the access restriction logic unit blocking further access to the secret information when a predetermined amount of time has passed after said starting up the programmed electronic device and while the device remains powered on, wherein the access restriction logic unit is a hardware component coupled between a processor unit and the data memory.

2. The method of claim 1, further comprising verifying the integrity of the software using the secret information.

3. The method of claim 2, wherein verifying the integrity of the software comprises:
computing a hash value of the software using a secret key related to the secret information; and
comparing the computed hash value with a predetermined signature associated with the software.

4. The method of claim 1, wherein the hash value is computed using a cryptographic hashing method.

5. The method of claim 1, wherein the predetermined amount of time is measured as a predetermined number of clock cycles.

6. The method of claim 1, wherein the programmed electronic device comprises the processor unit that accesses the secret information and thereafter causes the access restriction logic unit to block further access to the secret information.

7. The method of claim 1, wherein the secret information is individualized for each programmed electronic device.

8. The method of claim 1, wherein the programmed electronic device is a mobile communication device.

9. The method of claim 1, wherein the software is executed in the programmed electronic device only if the integrity of the software has been verified.

10. A method for protecting secret information in a programmed electronic device, the programmed electronic device comprising a non-trusted memory containing software, a data memory containing the secret information, and an access restriction logic unit that is adapted to allow or block read access to the secret information, the secret information being stored unalterably in the data memory, the secret information being adapted to be used for verifying the integrity of the software, the method comprising:
when starting up the programmed electronic device, the access restriction logic unit allowing read access to the secret information;
accessing the secret information for use in verifying the integrity of the software;
the access restriction logic unit blocking further read access to the secret information while the device remains powered on, wherein the access restriction logic unit is a hardware component coupled between a processor unit and the data memory; and
verifying the integrity of the software using the secret information, including:

computing a hash value of the software using a secret key related to the secret information; and comparing the computed hash value with a predetermined signature associated with the software, wherein the software is executed in the programmed electronic device only if the integrity of the software has been verified successfully.

11. The method of claim 10, wherein the hash value is computed using a cryptographic hashing method.

12. The method of claim 10, wherein the access restriction logic unit blocks access to the secret information when a predetermined amount of time has passed after starting up the programmed electronic device.

13. A semiconductor device, comprising:

a data memory storing secret information;

a program memory storing startup code;

a processor unit adapted for executing the startup code, the startup code being adapted to cause the processor unit to access the secret information in the data memory for use in verifying the integrity of software to be executed by the processor unit; and an access restriction logic unit that allows the processor unit to access the secret information after starting up the semiconductor device and blocks access to the secret information after the processor unit has accessed the secret information, wherein the access restriction logic unit is adapted to block access to the secret information when a predetermined amount of time has passed after said starting up the programmed electronic device and while the device remains powered on, wherein the access restriction logic unit is a hardware component coupled between the processor unit and the data memory.

14. The semiconductor device of claim 13, wherein the semiconductor device is a base band integrated circuit for a mobile communication device.

15. The device of claim 13, wherein the startup code is further adapted to cause the processor unit to verify the integrity of the software using the secret information.

16. The device of claim 15, wherein the startup code is further adapted to cause the processor unit to compute a hash value of the software using a secret key related to the secret information, and wherein the startup code is further adapted to cause the processor unit to compare the computed hash value with a predetermined signature associated with the software.

17. A programmed electronic device, comprising:

a data memory unalterably storing secret information;

a program memory storing startup code;

a non-trusted memory storing software;

a processor unit adapted for executing the startup code, the startup code being adapted to cause the processor unit to access the secret information in the data memory for use in verifying the integrity of the software stored in the non-trusted memory; and an access restriction logic unit that allows the processor unit to read the secret information after starting up the programmed electronic device and blocks read access to the secret information while the device remains powered on and after the processor unit has accessed the secret information, wherein the access restriction logic unit is a hardware component coupled between the processor unit and the data memory;

wherein the startup code is further adapted to cause the processor unit to verify the integrity of the software using the secret information, wherein the startup code is further adapted to cause the processor unit to compute a hash value of the software using a secret key related to the secret information, wherein the startup code is further adapted to cause the processor unit to compare the computed hash value with a predetermined signature associated with the software and wherein the software is executed in the programmed electronic device only if the integrity of the software has been verified successfully.

18. The device of claim 17, wherein the programmed electronic device is a mobile communication device.

19. The device of claim 17, wherein the access restriction logic unit is adapted to block access to the secret information when a predetermined amount of time has passed after starting up the programmed electronic device.

20. he device of claim 17, wherein the processor unit is adapted to cause the access restriction logic unit to block further access to the secret information after the processor unit accessed the secret information.

* * * * *